(12) United States Patent
Koch

(10) Patent No.: US 6,397,783 B1
(45) Date of Patent: Jun. 4, 2002

(54) RESTRAINT FOR ANIMALS

(75) Inventor: Heinrich Koch, Landsberg/Lech (DE)

(73) Assignee: Ernst Koch, Landsberg/Lech (DE)

( * ) Notice: Subject to any disclaimer, the term of this patent is extended or adjusted under 35 U.S.C. 154(b) by 0 days.

(21) Appl. No.: 09/697,298

(22) Filed: Oct. 27, 2000

Related U.S. Application Data

(63) Continuation of application No. PCT/EP99/02726, filed on Apr. 29, 1999.

(30) Foreign Application Priority Data

Apr. 29, 1998 (DE) .......................... 298 07 761

(51) Int. Cl.[7] .............................................. A01K 27/00
(52) U.S. Cl. ......................... 119/792; 119/856; 54/65; 54/19.1
(58) Field of Search ................. 119/795, 792, 119/863, 856, 858, 109, 797, 729; 224/153, 172; 54/65, 34, 19.1; D30/134, 152, 153

(56) References Cited

U.S. PATENT DOCUMENTS

| | | | |
|---|---|---|---|
| 2,175,283 A | * 10/1939 | Cote | |
| 2,734,483 A | 2/1956 | Peo | |
| 2,821,168 A | 1/1958 | Forbes | |
| 3,096,741 A | * 7/1963 | Ollstein | |
| 3,435,867 A | * 4/1969 | Hyden | |
| 3,441,005 A | * 4/1969 | Fink | |
| 4,735,035 A | * 4/1988 | Mattiolo | 54/34 |
| 4,962,929 A | * 10/1990 | Melton, Jr. | 273/29 |
| 4,970,991 A | * 11/1990 | Luce | 119/96 |
| 5,184,573 A | 2/1993 | Stevens | |
| 5,247,906 A | * 9/1993 | Stevenson | 119/795 |
| 5,503,894 A | * 4/1996 | Brown | 428/128 |
| 5,785,010 A | * 7/1998 | Koch | 119/863 |

FOREIGN PATENT DOCUMENTS

| | | | |
|---|---|---|---|
| DE | 8606248 | | 4/1986 |
| DE | 89 14 238 U | | 3/1990 |
| FR | 2703214 | * | 10/1994 |
| GB | 2050834 | | 1/1981 |

OTHER PUBLICATIONS

Patent Cooperation Treaty—International Preliminary Examination Report; Jul. 10, 2000; 6 pages.

* cited by examiner

*Primary Examiner*—Peter M. Poon
*Assistant Examiner*—Andrea M. Valenti
(74) *Attorney, Agent, or Firm*—Lawrence E. Laubscher, Sr.

(57) ABSTRACT

The present invention relates to a retaining or guiding material for dogs and a dog harness, characterized in that they consist at least partly of a woven tubular fabric having preferably inserted therein a padding. This considerably improves the comfort of the harness, both for the dog wearing it and the person handling the dog.

19 Claims, 3 Drawing Sheets

RESTRAINT FOR ANIMALS

REFERENCE TO RELATED APPLICATION

This application is a continuation of the PCT application No. PCT/EP99/02726 filed Apr. 9, 1999, which is based on German application No. 29807761.2 filed Apr. 29, 1998.

BACKGROUND OF THE INVENTION

1. Field of the Invention

The present invention relates to a retaining and guiding material for dogs. The retaining and guiding material according to the present invention is particularly suitable for dog leads and collars, dog harnesses and the like.

2. Brief Description of the Prior Art

The German Gebrauchsmuster No. G 94 12 362.4 discloses a neck strap provided with a quick-closure mechanism and a safety means bridging said quick-closure mechanism and preventing the dog from slipping off the neck strap, if said quick-closure mechanism should have been opened unintentionally. This neck strap consists of a high-strength flat nylon strap. A lead can be attached to this neck strap.

The known straps, leads, neck straps and harnesses normally consist of a comparatively thick and high-strength strip.

Neck straps are, if possible, attached loosely to the animal so as to prevent unnecessarily high pressure from being transmitted to the animal's neck. A loosely attached neck strap, however, entails the risk of said neck strap rubbing the animal's neck due to its own inertia. Also with regard to safe guidance of the dog, which is desired in many cases, a comparatively loose attachment of the neck strap proves to be disadvantageous. When strong forces are transmitted, high surface pressures will occur especially in the edge area of the straps.

SUMMARY OF THE INVENTION

It is the object of the present invention to provide a retaining and guiding material for dogs which, used as a dog lead and/or dog collar and/or dog harness, offers, on the one hand, increased comfort for the animal wearing it and, on the other hand, increased handling comfort for the animal owner.

According to the present invention, comparatively strong guiding forces are transmitted to a substantially reduced load acting on the area where the animals are in contact with the strap, especially the neck area. The hoselike shape of the strap leads to the result that the pulling forces to be transmitted by the strap will be distributed to a contact section which is in contact with the animal and an outer section facing outwards. The contact section which is in contact with the animal and the outer section facing outwards are laterally displaceable relative to each other due to the hoselike shape of the strap. The displaceability of the contact section and of the outer section relative to one another permits appropriate positioning of the neck strap thus reducing the load concentration which has occurred up to now in the lateral edge area of the straps. Due to the reduction of the pressure occurring in the edge area of the strap, especially the neck strap, a much more advantageous pressure distribution between the neck strap and the animal will be obtained. Furthermore, a sufficient strength in combination with an extremely low own weight of the strap is obtained.

An embodiment of the strap which is advantageous with regard to a particularly uniform distribution of forces is given in view of the fact that the hose is preferably implemented as a woven integral hose. The contact section facing the animal in the attached condition and the complementary outer section facing away from the animal are therefore defined in common by the hose wall. The inner wall of the hose is preferably comparatively smooth. This will improve the appropriate positioning and therefore the adaptation of the hose to the instantaneous load condition.

The retaining and guiding material consists preferably of a woven plastic material, such as a woven polyamide hose, but it is not limited to this kind of material. The retaining and guiding material may also be a woven hose of textile material.

The weaving structure of the strap is advantageously chosen such that the tensile stiffness of the strap is higher in the longitudinal direction of the strap then in the transverse direction thereof. Also this permits the pressure acting on the animal's neck in the edge area of the strap to be substantially reduced in an advantageous manner. It will be of advantage when the hose consists of a synthetic fibre material, in particular a polyamide fibre material. Such fibers permit a particularly weight-saving mode of realizing the strap. A neck strap of this kind can be washed easily, if desired under addition of cleaning agents.

Especially when a synthetic fibre material is used, the hose is formed of threads which are woven together, the respective threads being, in turn, formed of extremely fine microfibers which may be spun together, if desired. A particularly soft strap having a high flexibility and a high tensile stiffness is obtained in this way.

An embodiment of the strap which is advantageous with regard to a sufficient dimensional stability is given in view of the fact that, in a transition area between the contact section and the outer section, a fold zone extending in the longitudinal direction of the hose is provided. When this fold zone is suitably realized, it can be achieved in an advantageous manner that the hose will automatically assume a substantially flat initial configuration. This fold zone can be defined under the influence of heat, e.g., by ironing the hose, or by a specific weaving or looping structure. Especially in the case of comparatively broad straps it will be possible to provide respective fold zones on both longitudinal sides of the strap.

According to a particularly preferred embodiment of the present invention, the fold zone is formed by a weaving or looping location extending in the longitudinal direction of the hose. This weaving or looping location defines a high-strength connection along which a strip material produced preferably by a weaving process is connected by weaving or looping so as to form an integral hose. The weaving or looping location is preferably implemented such that, also in the area of said weaving or looping location, the integral hose will largely have the same mechanical properties as in the other wall areas thereof. The weaving or looping location is, however, preferably implemented such that it will support flat folding of the hose.

In order to guarantee that the weaving or looping location extends in the lateral area of the strap, said weaving or looping location is preferably marked by a different color. This is preferably done by using a weaving or looping thread dyed With a contrasting color in comparison with the rest of the strap.

Alternatively to such colored marking of the lateral area of the strap, or also in combination therewith, it is according to an advantageous embodiment also possible to mark at least one side of the strap by a different color. For this purpose, threads dyed with a contrasting color are advantageously woven into or twisted into the respective wall area of the integral hose.

An embodiment of the strap which is advantageous with regard to a particularly uniform surface pressure caused by the retaining forces applied via the strap is given in view of the fact that the hose accommodates therein, at least in certain sections thereof, a lining or padding means. This lining or padding means is advantageously formed by a padding member having a flat, in particular a substantially flat, rectangular cross-section.

The padding member is preferably formed of an, in principle, dimensionally stable body of soft material and loosely accommodated in the interior of the integral hose. An embodiment of the strap, especially of the neck strap, which is advantageous with regard to a particularly low surface pressure, is given in view of the fact that the cross-section of the padding member is implemented such that, in a sectorial plane extending at right angles to the longitudinal direction of the strap, the circumferential length of the cross-section is smaller than an inner circumference of a corresponding cross-section of the hose. A padding member dimensioned in this way can be introduced in the hose substantially loosely. The positioning properties of the strap, in particular the displaceability of the wall which is in contact with the animal relative to the wall facing away and outwards, are improved still further by a loosely inserted padding member of this kind.

An embodiment which is of advantage with respect to an advantageous surface pressure of the strap and of the neck strap, respectively, is given in view of the fact that the width of the padding member is smaller than half the inner circumference of the hose. As far as its thickness is concerned, the padding member is advantageously dimensioned such that this thickness corresponds to at least 30% of the strap thickness measured at right angles to the contact surface.

The width of the padding member inserted in the hose preferably amounts to at least 56% of the width of the strap.

The padding member preferably consists of a preferably multilayered body of foamed plastic. According to a special aspect of the present invention, a closed-pore foam material is used as its foam material. This will reduce the amount of water which may perhaps be absorbed by the strap, and a reduction of the drying time will be achieved. In a particularly advantageous manner, it will also be possible to provide in this way a strap, especially a neck strap, which is, in principle, floatable and which may perhaps also act as its a swimming aid.

The foam material used for forming the padding member is preferably a foam material consisting of a thermoplastic or heat fusible plastic material. Hence, it is possible to locally melt the padding material, which may first be introduced in the integral hose along the whole length thereof, in an advantageous manner and to flatten the initially padded hose in certain sections thereof. In the flattened area, the respective lateral portions of the integral hose can be welded together by the molten material of the padding member. Such an area of the hose can easily be inserted into suitable eye members, which may be formed, e.g., on a quick-locking clasp.

BRIEF DESCRIPTION OF THE DRAWINGS

Further details and features of the present invention can be seen from the description of several preferred embodiments following hereinbelow in connection with the drawing, in which:

FIG. 1A is a sectional view taken along line 1A—1A of FIG. 1.

DETAILED DESCRIPTION

Figure 1:
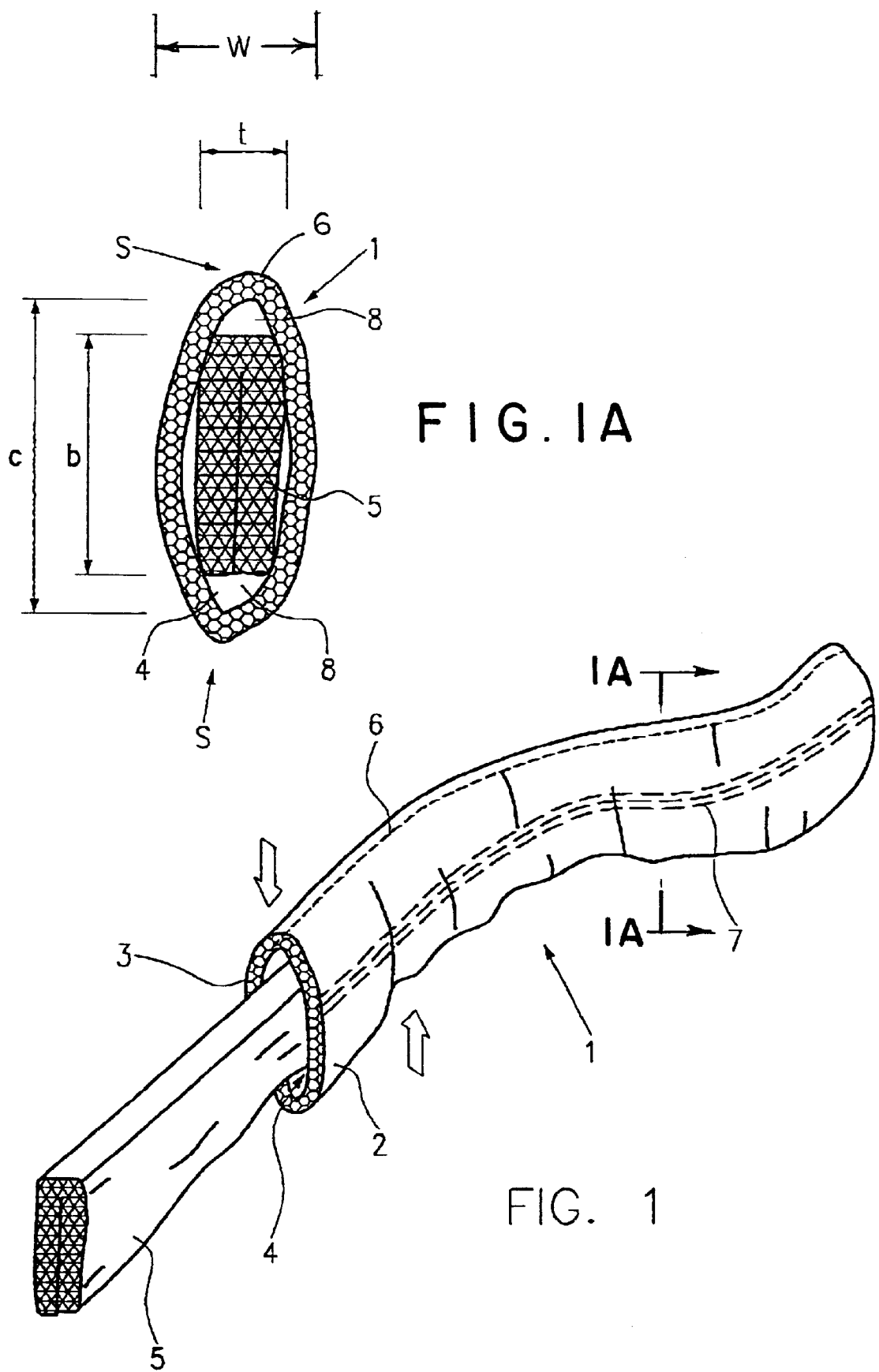
FIG. 1 shows a perspective view of a strap section of a strap for retaining and guiding, animals, said strap section being form of an integral hose and accommodating therein a padding member.

The strap section shown in a simplified representation in FIG. 1 comprises an integral hose 1 woven from a great number of polyamide threads. The integral hose 1 forms a contact section 2 intended, for large area contact with, e.g., the neck area of an animal or the arm of an animal owner as its well as an outer section 3 facing away from said last mentioned section.

In the interior of the integral hose 1 a hose interior 4 is defined, said hose interior accommodating a padding member 5. The integral hose 1 is formed of a woven fibre material. In the case of the embodiment shown in the present invention, the fibre material consists of polyamide threads, each individual polyamide thread being, in turn, formed of a great number of polyamide microfibers.

The integral hose comprises a warp/looping location 6 extending in the longitudinal direction of said integral hose 1. The looping location 6 is formed in one of the flat folded lateral edge portions S defined in the integral hose wall between the contact section 2 and the outer section 3. Also, on the longitudinal lateral edge of the integral hose 1 located opposite the looping location 6, the woven structure may be modified such that it tends to define a well-marked lateral edge area of the integral hose 1.

The integral hose 1 is preferably woven in a woven structure giving the hose wall a comparatively large thickness (e.g., three times the thread thickness). Furthermore, the woven structure of the strap section shown here is chosen such that a high stiffness is obtained in the longitudinal direction of the integral hose and a comparatively low stiffness in the circumferential direction of said integral hose 1 and that a high flexibility is achieved. The weaving technique is additionally chosen such that the inner side of the integral hose defining the hose interior 4 is comparatively smooth. This permits the contact section 2 and the outer section 3 to be displaced relative to one another, as its can be seen from the arrows shown.

The looping location 6 of the embodiment shown here is marked by a warp/looping thread dyed with a contrasting color. Also the contact section 2 is marked by a woven-in band structure 7 which is dyed with a contrasting color. As its can be seen clearly from the detail view, the padding member 5 arranged in the interior of the integral hose 1 is accommodated substantially loosely in the hose interior 4.

The padding member 5 is here defined by a flat strip of soft material formed by a closed-cell, foamed thermoplastic polymer in the present case. The width b of the padding member 5 is smaller than a dimension c corresponding approximately to half lie length of the inner circumference of the integral hose 1. A respective cavity 8 having a triangular cross-section ("gusset") is thus formed in the area of each of the lateral edges S of the integral hose 1. By means of this cavity 8, the lateral edge area of the integral hose 1 is relieved in a particularly advantageous manner. The contact section 2 and the outer section 3 abut substantially loosely on the respective lateral surfaces of the padding member 5. The thickness of the padding member 5 is here 2.5 times as large as the wall thickness of the integral hose 1. The width b of the padding member is at least two to six times as large as the thickness t of the padding member 5 (here three times as its large). The thickness t of the padding member 5 is at least 30% of the total thickness (w) of the strap.

The above described strap can be used in the form of a simple, if desired adjustable collar or as a lead.

Figure 2:
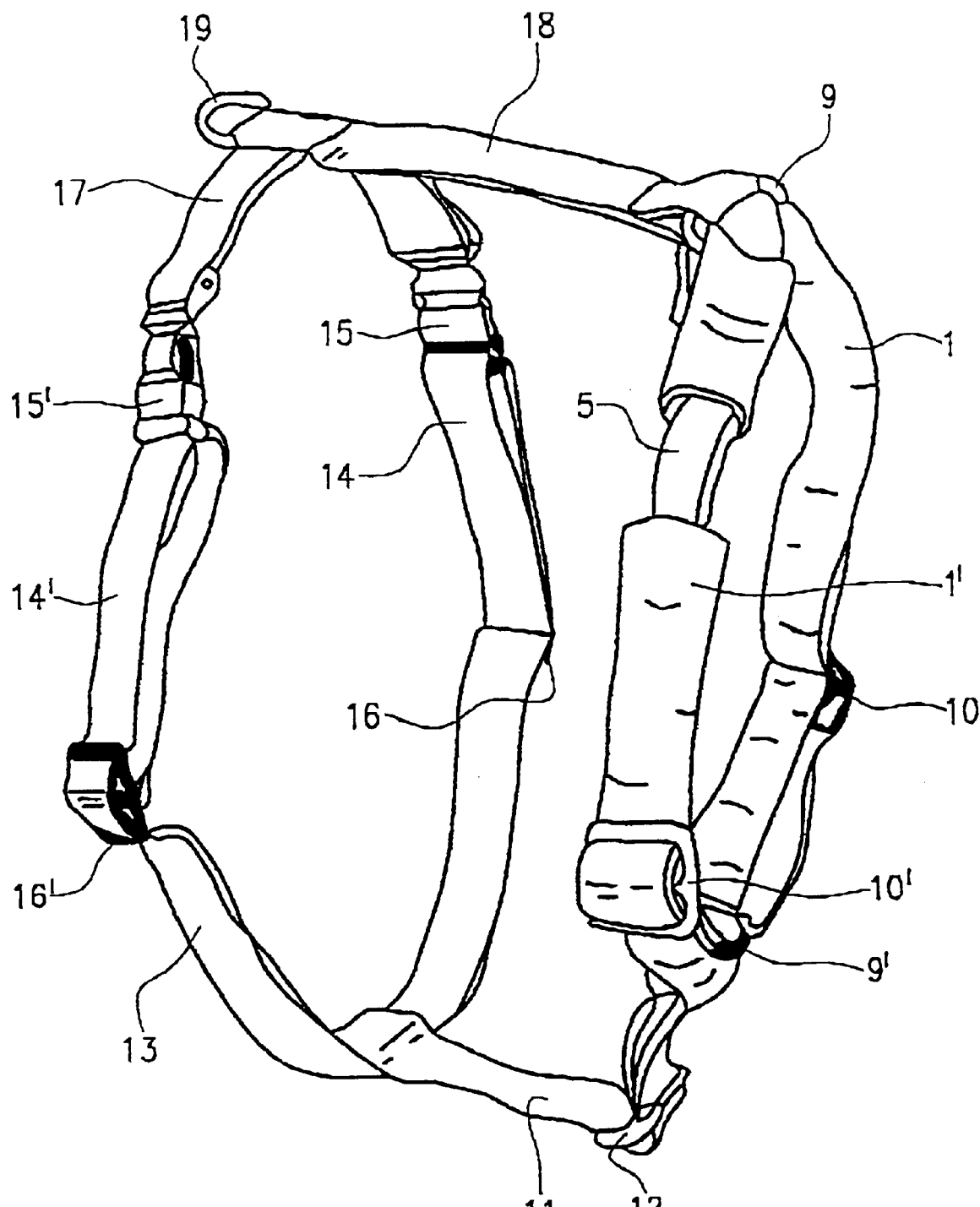
FIG. 2 shows a perspective view of a dog harness comprising a neck strap unit which consists of a woven integral hose provided in certain sections thereof with a loosely inserted pad of soft material.

It is also possible to use the above described strap material for forming a harness, as can be seen in FIG. 2. In the case of the harness shown in, FIG. 2, a neck strap unit comprises two integral hose segments 1, 1' in the interior of which the padding member 5 is loosely accommodated, as its can be seen from the section shown in a broken up representation. The integral hose is passed through a retaining ring 9 in the upper end area thereof and sewn together so as its to form a loop. The padding member 5 is fixed by the respective seam in the interior of the integral hose 1 and 1' in the longitudinal direction of the hose. The integral hose 1 is passed through a further retaining ring 9' in the lower area of the harness, whereby another loop is formed. The effective neck width of the neck strap formed by the integral hose segments 1, 1' is adjustable via an adjustment means 10, 10'. Adjacent the lower loops formed on the integral hose segments 1, 1' and encompassing the retaining ring 9', a strap section consisting here of a flat strip material (longitudinal strap) 11 is secured in position by means of the retaining ring 9'. The length of the strap section 11 can be adjusted by a further adjustment means 12. The strap section 11 is fixed to a retaining belt 13 in an end section facing away from the retaining ring 9'.

The retaining belt 13 has formed thereon two loop sections 14, 14' which each extend through a respective eye of a quick-locking clasp 15, 15'. For adjusting the length of the retaining belt 13, adjustment means 16, 16' are provided whose structural design is similar to that of the adjustment means 10, 10' and 12. The locking members associated with the respective quick-locking clasps 15, 15' are, in turn, attached to a retaining belt section 17 which is connected via a longitudinal bridge (longitudinal strap) 18 to the retaining ring 9 and, consequently, to the upper end sections of the integral hose 1, 1'. The end of the longitudinal bridge 18 which is located adjacent the retaining belt section 17 has secured thereto a pull ring 19 which is adapted to have releasably attached thereto a lead, e.g., via a snap hook.

According to a further embodiment the neck strap unit may comprise a first adjustment means which is used for adjusting the length of said neck strap unit and which, according to an additional advantageous embodiment (not shown here), may also be provided with a quick-closure mechanism in order to make it easier to put the neck strap on quickly. In the case of such a strap unit, this quick-closure mechanism can be bridged by a safety means in a "parallel connection" so as its to achieve a safety effect with regard to the retaining or the leading of the animal, as its can be seen, e.g., in WO 96/03864. In the area of the neck strap unit, a pull ring will normally be provided for releasably fastening (snap hook) a lead for the person handling the animal. This pull ring is then preferably not provided in an area carrying the closure mechanism so that the pulling forces of the animal will not act on a quick-closure mechanism.

Preferably, the upper or the lower longitudinal strap can be closed and/or adjusted in length by a closure mechanism and/or by a second adjustment means. In order to make it easier to put the harness on, the retaining belt, which is closed in the area of the animal's back or belly, is provided with a quick-closure mechanism, preferably, it s also possible to provide two such closure mechanisms on both sides of the points where the upper and lower longitudinal straps 18, 11 are applied to the retaining belt 13.

In the embodiment of the harness shown here only the harness sections defining the neck strap are formed by the integral hose. In accordance with an advantageous embodiment, it is also possible to use the described integral hose, which, if desired, may have introduced therein the padding member 5, for forming additional parts of the harness. In particular, it may be of advantage to form also the retaining belt 13 and the longitudinal bridge 18 making use of said integral hose. It is also possible to form all the strap elements of the described harness making use of the integral hose described.

Figures 3, 3A:
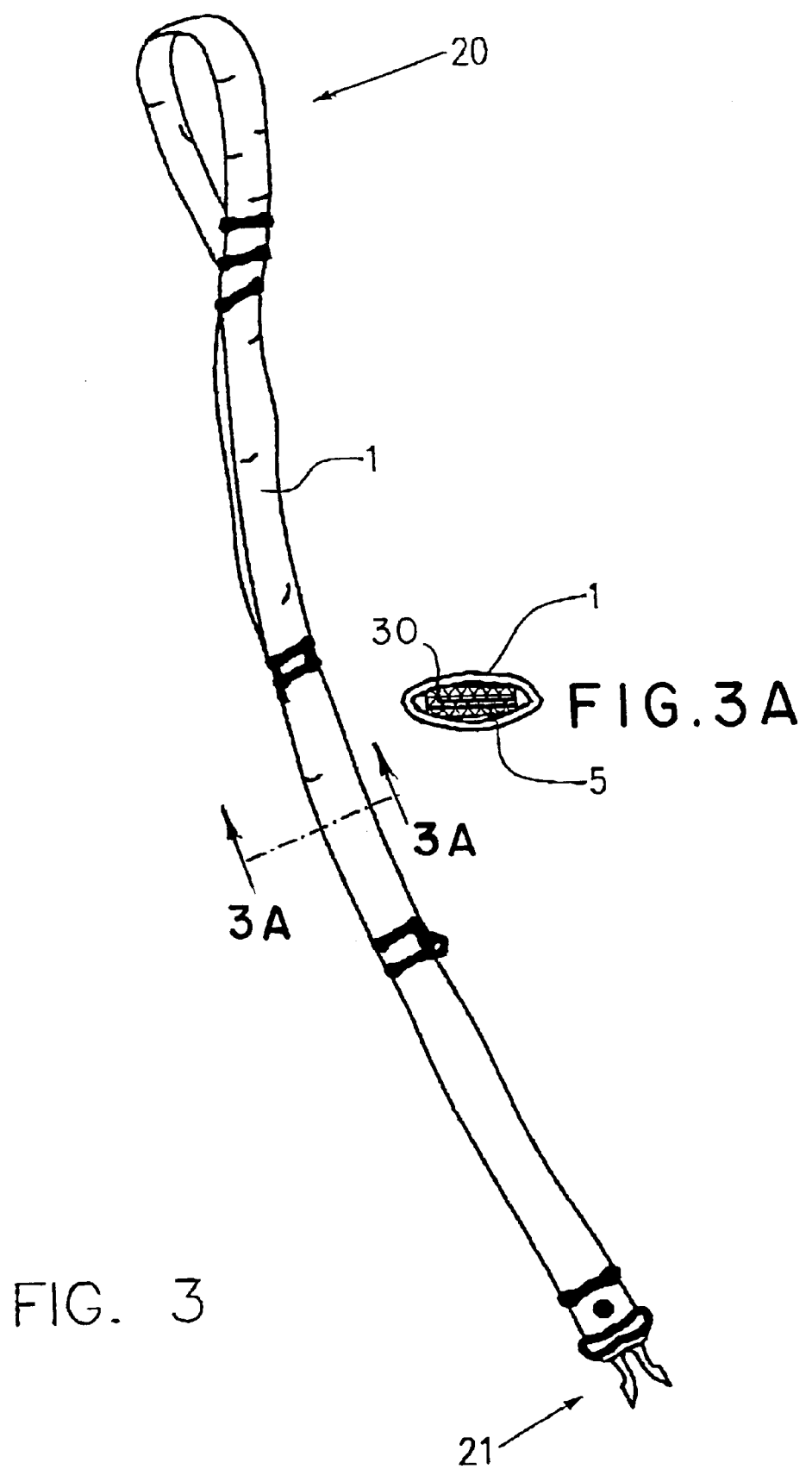
FIG. 3 shows a perspective view of a lead produced from a strap material according to the present invention.
FIG. 3A is a sectional view taken along line 3A—3A of FIG. 3.

The lead shown in FIG. 3 is also made from a strap material consisting of a flexible tubular woven fabric or hose. The padding member 5 is loosely accommodated in the interior of the hose 1 in the upper handling area 20 as its well as its in the lead area following said handling area 20 in the direction of the fastening device 21. Due to its high flexibility, the lead realized in this way can be wrapped round the wrist several times and, even if high pulling forces are applied, it will not leave any wefts. The lead area located between the fastening device 21 and the gripping area 20 can be seized in a particularly reliable manner with one hand. The simplified sectional view of FIG. 3A illustrates the cross-section of the lead in the portion marked by dot and dash lines. The padding member has inserted therein a flexible transverse stiffening layer 30.

It goes without saying that the tubular shape can also be formed by connecting two strips of material (textile or plastic material). The integral hose, consisting preferably of a plastic material, is clearly preferred for forming straps, such as its a neck strap or a dog collar, a dog lead or a dog harness. If desired, it is also possible to provide only part of the harness, collar or lead in a tubular shape, preferably in a tubular shape provided with an insert of padding material.

While the preferred objects and advantages of the invention have been illustrated and described, it will be apparent that changes may be made in the invention without deviating from the inventive concepts set forth above.

What is claimed is:

1. An animal restraint, comprising:
   (a) a flexible strap, including:
      (1) a padding member (5) formed from a resilient having a generally rectangular cross-section defining a wider first pair of opposed walls, and a narrower second pair of opposed side walls;
      (2) a tubular integral hose member (1) arranged concentrically about said padding member, said hose member being formed from a synthetic plastic material and having a smooth inner circumferential surface the dimension of which is greater than that of said padding member, said hose member having a non-circular cross-sectional including:
         (a) inner contact (2) and outer (3) vertical side portions in engagement with at least portions of said padding member first walls, respectively, said inner contact portion being operable to engage the animal; and
         (b) a pair of upper and lower flat folded zones (S) that define cavities (8) extending adjacent said padding member horizontal second walls, respectively;

(b) connecting means connecting together portions of said strap to form an enclosure for receiving a portion of the animal; and (c) marking means (7) for marking the contact and outer sections, respectively, said marking means being woven into the wall of said hose.

2. An animal restraint, comprising:

(a) a flexible strap, including:

(1) a padding member (5) formed from a resilient having a generally rectangular cross-section defining a wider first pair of opposed walls, and a narrower second pair of opposed side walls;

(2) a tubular integral hose member (1) arranged concentrically about said padding member, said hose (1) consisting of threads which are woven together, said threads consisting of microfibers, said hose member being formed from a synthetic plastic material and having a smooth inner circumferential surface the dimension of which is greater than that of said padding member, said hose member having a non-circular cross-sectional including:

(a) inner contact (2) and outer (3) vertical side portions in engagement with at least portions of said padding member first walls, respectively, said inner contact portion being operable to engage the animal;

(b) a pair of upper and lower flat folded zones (S) that define cavities (8) extending adjacent said padding member horizontal second walls, respectively; and (b) connecting means connecting together portions of said strap to form an enclosure for receiving a portion of the animal.

3. An animal restraint, comprising:

(a) a flexible strap, including:

(1) a padding member (5) formed from a resilient having a generally rectangular cross-section defining a wider first pair of opposed walls, and a narrower second pair of opposed side walls;

(2) a tubular integral hose member (1) arranged concentrically about said padding member, said hose member being formed from a synthetic plastic material and having a smooth inner circumferential surface the dimension of which is greater than that of said padding member, said hose member having a non-circular cross-sectional including:

(a) inner contact (2) and outer (3) vertical side portions in engagement with at least portions of said padding member first walls, respectively, said inner contact portion being operable to engage the animal;

(b) a pair of upper and lower flat folded zones (S) characterized in that one of said fold zones is formed by a weaving location (6) extending in the longitudinal direction of the hose (1) that define cavities (8) extending adjacent said padding member horizontal second walls, respectively; and (b) connecting means connecting together portions of said strap to form an enclosure for receiving a portion of the animal.

4. An animal restraint according to claim 3, characterized in that the weaving location (6) is emphasized by a different color.

5. An animal restraint, comprising:

(a) a flexible strap having a greater tensile stiffness in the longitudinal direction of said strap than in the transverse direction, including:

(1) a padding member (5) formed from a resilient having a generally rectangular cross-section defining a wider first pair of opposed walls, and a narrower second pair of opposed side walls;

(2) a tubular integral hose member (1) arranged concentrically about said padding member, said hose member being woven from a polyamide fiber material and having a smooth inner circumferential surface the dimension of which is greater than that of said padding member, said hose member having a non-circular cross-sectional including:

(a) inner contact (2) and outer (3) vertical side portions in engagement with at least portions of said padding member first walls, respectively, said inner contact portion being operable to engage the animal;

(b) a pair of upper and lower flat folded zones (S) that define cavities (8) extending adjacent said padding member horizontal second walls, respectively; and (b) connecting means connecting together portions of said strap to form an enclosure for receiving a portion of the animal.

6. An animal restraint according to claim 5, characterized in that a marking means (7) is provided for marking the contact and outer section(s) (2, 3), respectively.

7. An animal restraint according to claim 5, characterized in that said hose (1) accommodates therein, at least in certain sections thereof, a lining means.

8. An animal restraint according to claim 7, characterized in that said padding member (5) has a width (t) which is less than half of said inner circumference of said hose (1).

9. An animal restraint according to claim 5, characterized in that said padding member (5) has a thickness (t) of at least 30% of the total thickness (w) of said strap.

10. An animal restraint according to claim 5, characterized in that said padding member (5) has a height (b) of at least 50% of said width of said hose (1).

11. An animal restraint according to claim 5, characterized in that said padding member (5) is made of a buoyant material, thereby to allow said restraint to float.

12. An animal restraint according to claim 5, characterized in that said padding member (5) includes longitudinally therein a flexible transverse stiffening layer (30).

13. An animal restraint as defined in claim 5, wherein a plurality of said flexible straps are provided, including a first pair of parallel spaced straps (11, 18) arranged longitudinally on opposite sides of the animal; and further wherein said connecting means comprises a neck strap unit including:

(a) a circular retaining belt (13) adapted to extend around a portion of the animal, said retaining belt being connected between corresponding adjacent ends of said upper and lower straps; and (b) separable fastener means (15, 15') that are contained within said retaining belt and are operable to an open position, thereby to permit a portion of the animal to be introduced within said retaining belt.

14. An animal restraint according to claim 13, characterized in that said neck strap unit is adapted to be longitudinally adjusted by a first adjustment means (10, 10').

15. An animal restraint according to claim 13, characterized in that said neck strap means is provided with a quick-closure mechanism which is bridged in a parallel arrangement by a strap piece including a safety means.

16. An animal restraint according to claim 13, characterized in that said upper and lower longitudinal straps (18, 11)

are adapted to be longitudinally adjusted by second adjustment means (12).

17. An animal restraint according to claim 13, characterized in that the retaining belt (13) is provided with at least one quick-closure means (15, 15').

18. An animal restraint according to claim 17, characterized in that said quick-closure means (15, 15') are provided on both sides of a point where the upper longitudinal strap (18) is applied to the retaining belt within said retaining belt.

19. An animal restraint comprising:
   (a) a flexible strap, including:
      (1) a padding member (5) formed from a resilient closed-pore synthetic plastic material, said padding member including a pair of opposed first vertical walls having a given height (b), and a second pair of opposed horizontal walls having a width (t) that is less than said given height; and
      (2) a tubular integral hose member (1) arranged concentrically about said padding member, said hose member being formed from a synthetic plastic polyamide fiber material and having a smooth inner circumferential surface the dimension of which is greater than that of said padding member, said hose member having a non-circular cross-sectional configuration including:
         (a) a pair of parallel inner contact (2) and outer (3) vertical side portions in engagement with said padding member first walls, respectively;
         (b) a pair of upper and lower flat folded zones (S) that define cavities (8) extending above and below said padding member horizontal second walls,
         (c) said padding member being laterally slidably displaceable vertically within said hose member;
      (3) said strap having a greater tensile stiffness in the longitudinal direction of the strap than in the transverse direction; and
   (b) connecting means connecting together portions of said strap to form an enclosure for receiving a portion of an animal.

\* \* \* \* \*